United States Patent [19]

Samadi et al.

[11] Patent Number: 5,664,007
[45] Date of Patent: Sep. 2, 1997

[54] METHOD AND APPARATUS FOR PROVIDING CONTINUATION OF A COMMUNICATION CALL ACROSS MULTIPLE NETWORKS

[76] Inventors: Behrokh Samadi, 22 Longview Dr., Holmdel, N.J. 07733; Kazem A. Sohraby, 116 University Dr., Lincroft, N.J. 07738

[21] Appl. No.: 398,728

[22] Filed: Mar. 6, 1995

[51] Int. Cl.⁶ ............................ H04Q 7/22; H04Q 7/24; H04Q 7/38
[52] U.S. Cl. ............................................ 455/442; 379/212
[58] Field of Search .................................. 379/58, 59, 60, 379/62, 63, 201, 202, 210, 212; 455/33.1, 33.2, 34.1, 54.2

[56] References Cited

U.S. PATENT DOCUMENTS

| | | | |
|---|---|---|---|
| 4,424,418 | 1/1984 | Moore et al. | |
| 4,850,011 | 7/1989 | Delmege et al. | |
| 4,893,335 | 1/1990 | Fuller et al. | 379/212 X |
| 5,307,399 | 4/1994 | Dai et al. | 379/57 |
| 5,463,674 | 10/1995 | Gillig et al. | 379/59 |
| 5,550,754 | 8/1996 | McNelley et al. | 364/514 A |

*Primary Examiner*—Dwayne Bost
*Assistant Examiner*—Nay Maung

[57] ABSTRACT

A method and apparatus is disclosed for providing continuation of a communication call as a user moves from the coverage area of one communication network to the coverage area of another communication network having different access media and different applications. A voice, data, video or multimedia call involving multiple end-points which may be located on different networks may be placed on hold pursuant to a pause request made by a user of one of the end-points. The networks include processors programmed to interrupt and recognize specified signals, such as a pause request signal, and to respond by providing reconnection identification information. The user making a pause request may generate a reconnection request in a different network to continue the paused call on the new network by using a calling device that is compatible with the access media and applications provided by the new network. Each network has the capability of communicating with processors associated with other networks to establish a new route for the call so that once a reconnection request is received, the call may be resumed.

42 Claims, 7 Drawing Sheets

METHOD AND APPARATUS FOR PROVIDING CONTINUATION OF A COMMUNICATION CALL ACROSS MULTIPLE NETWORKS

FIELD OF THE INVENTION

The present invention relates generally to communication systems, and, in particular, to a method and apparatus for providing continuation of a communication call as a user moves from the coverage area of one communication network to the coverage area of another communication network during the call.

BACKGROUND OF THE INVENTION

A variety of wired and wireless communication devices, each offering different capabilities, applications and services, are and will continue to be available to suit an individual's needs. Providing all capabilities and services on all wired or wireless handsets, however, is not a likely scenario due to the requirements of radio or other media access, air interface protocols, and processing technology that may not be available or cost effective. For example, while a particular network may be capable of handling infra-red radio access only, other networks may be equipped to handle other radio access technologies, that are incompatible with the radio access of the first network. Furthermore, the applications offered on a particular network may cover a specific area that is designed for the particular needs of its users. Thus, for example, an office building or shopping mall may be covered by one or more local cells that are designed for the needs of employees or customers and their specific applications. In addition to being covered by the local specialized radio cells, the building or mall may also offer common services, such as voice communications, as part of a public wireless network. Each of the networks may require the use of different handsets, for example, that are tailored to the specific applications accessible through that network. Thus, for example, handsets capable of handling voice communications only may be used in one network, whereas devices capable of handling multimedia communications, such as voice, data and video may be used in another network environment.

As a user moves from a wireless or wired environment that supports a particular radio access and particular applications to an environment with different access and services, it is desirable to provide continuity of common services for the duration of a call. In particular, it is desirable to provide interconnections between the networks with the capability of signaling between the networks so as to permit an ongoing call to continue when a user travels from an area covered by one communication network to an area covered by a different communication network.

SUMMARY OF THE INVENTION

The present invention discloses a method and apparatus for providing continuation of a communication call as a user moves from the coverage area of one communication network to the coverage area of another communication network. A voice, data, video, multimedia, broadcast or multicast call, for example, involving multiple end-points which may be located on different networks, may be placed on hold in response to a pause request made by a user of one of the end-points. The networks may suitably include processors programmed to interrupt and recognize specified signals, such as a pause request signal, and to respond by providing reconnection identification information. The user making a pause request may generate a reconnection request in a different network to continue the paused call on the new network. Each network has the capability of communicating with processors associated with other networks to establish a new route for the call so that once a reconnection request is received, the call may be resumed.

According to one aspect of the invention, a method of providing continuation of a communication call across multiple networks preferably comprises the step of establishing a call between multiple end-points via a first network. The method also includes the steps of receiving a pause request signal generated by a user of one of the end-points and transmitting reconnection identification information. In one embodiment, the reconnection identification information subsequently may be used by the caller, for example, to reestablish a connection for the call after he has moved to the coverage area of a second network. The method may further include the step of holding the call on the first network. A reconnection request signal generated by the user, as well as the reconnection identification information, may be received in the second network. The paused call may then be reconnected to the user via the second network.

Other features and advantages of the present invention will be readily apparent by reference to the following detailed description and accompanying drawings.

DETAILED DESCRIPTION

Figure 1:
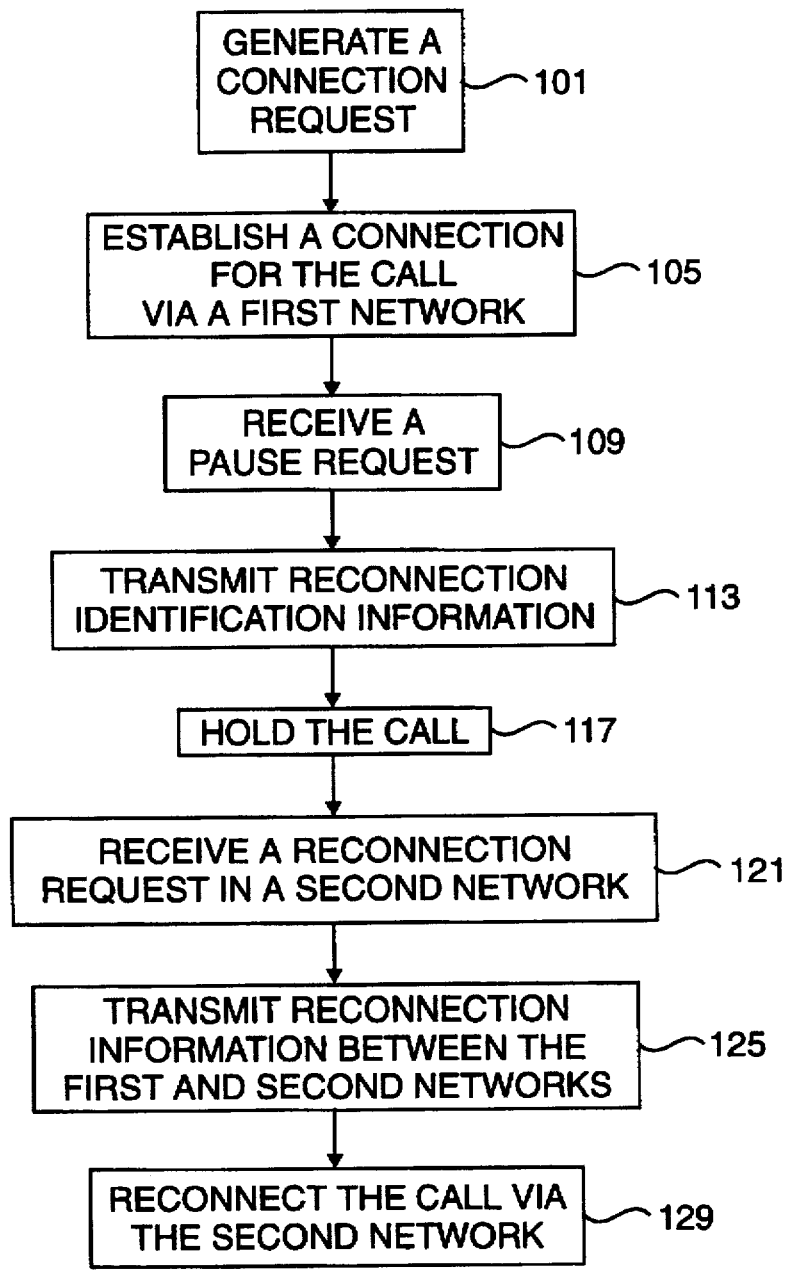
FIG. 1 is a flow diagram of a connection method according to the present invention.

FIG. 1 is a flow diagram illustrating a method of providing continuity of service among multiple communication networks according to the present invention. This method may also be referred to as connection relay. The connection relay method disclosed herein assumes that the area covered by a communication network may end at a cell boundary. The multiple networks involved in a particular communication call may be either wired or wireless. In addition, the geographical areas covered by the networks involved in a particular call may be different. Specifically, the areas covered by the networks may overlap partially or they may be non-overlapping. It is further assumed that the handsets or devices that are used to access the services provided by the different networks may employ different access media. Furthermore, while the multiple networks may support different services or applications, it is assumed that the networks involved in a particular call share at least a subset of common services or applications, such as voice communications, for example.

With respect to FIG. 1, as indicated by step 101, a first user may generate a connection request. The connection request may be generated, for example, by dialing a telephone number in the case of a voice call. In the case of a data, video or multimedia call, a destination address may be used. As discussed further below, a user may dial the desired number by using a mobile or cellular phone 221, a laptop personal computer 228, a personal communicator 321, or any other suitable calling device. Next, as indicated by step 105, a connection is established for the call via a first communication network which covers the area from which the connection request was generated. Other parties at the receiving end of the call may be located within the coverage area of the first network or within the coverage area of different networks. In any event, the call may be established according to well known techniques depending upon whether the networks are wired or Wireless and depending upon the nature of the call, in other words, whether it is voice, data, video, multimedia, broadcast or multicast.

Once the call is established and communication between the parties is in progress, any party may generate a pause request signal. The party or user in the first network may generate a pause request signal, for example, because he is moving to the coverage area of a different network some of whose services and applications cannot be supported by the handsets or other calling devices used in connection with the first network. In addition, the radio or communication access environment of the new network may be different from that of the first network. The user, therefore, would be unable to continue the call on the handset which he is currently using if he wishes to access services or applications in the new network which cannot be supported by the calling devices used in the first network.

An exemplary situation in which the present invention is advantageous is where a user of the cellular phone 221 is holding a conference call with at least one other party while travelling in his automobile. The user of the cellular phone 221 arrives at his destination, his place of employment, for example, where he usually uses, for example, a phone 221' connected by a modem 224' to a laptop computer 228'. He may wish to send data to the other parties to the conference call by using the laptop computer 228', assuming that the other parties can receive data on their respective calling devices. Alternatively, for example, the other parties may be engaged in a video-telephone conference call which allows each party to see the other parties as well as communicate with one another by voice. The user of the cellular phone 221 may also be connected to the conference call for voice communications while he is travelling in his automobile through the use of the cellular phone 221. Of course, he would not have the advantage of seeing the other parties during the course of the call. If the user of the cellular phone 221 has, for example, a calling device 321' with an attached camera 325' and video monitor 326' at his place of employment, he may also wish to see the other parties as well as allow the other parties to see him by using the calling device 321' and the camera 325' and monitor 326'. The present invention would allow the user of the cellular phone, for example, to generate a pause request and subsequently be reconnected to the call using a different calling device on the new network.

Once the pause request is generated, it would be received by the network through which the call is connected to the user who generated the pause request, as indicated by step 109. Thus, for example, if the first user generates a pause request, it would be received by the first network. In response to receiving the pause request, the first network would transmit reconnection identification information to the user who generated the pause request, as indicated by step 113. The reconnection identification information may include, for example, a code that identifies the first network as well as a combination of signals that identify the particular session or call that is paused. As indicated by step 117, the first network also would park the call in response to the pause request. The phrase "park a call" means that the call is held, in other words, that it is not terminated, pending the receipt of a reconnection request, as explained below, or the passing of a predetermined time interval. The steps of transmitting reconnection identification information and holding the call may be performed automatically in response to receipt of the pause request signal. It should be noted that, when the pause request is generated, neither the user nor the network that parked the call needs to know the network on which the call will be continued.

The user who generated the pause request, the first user for example, may then move to the coverage area of a second network whose radio or communication access environment may be different from that of the first network. After obtaining a handset or other calling device suitable for use in the second network, the first user would then register with the second network, for example, by dialing a standard publicly known telephone number in the case of voice call, and transmit a reconnection request signal to the second network. The reconnection identification information that was transmitted to the user in step 113 may also be received by the second network. As explained further below, in one embodiment, the user may transmit the reconnection identification information to the second network. In another embodiment, the reconnection identification information may be received automatically by the second network. In any event, the reconnection request signal, as well as the reconnection identification information, would be received by the second network as indicated by step 121.

Upon receiving the reconnection request, the second network would determine that the user wishes to continue a call that was paused on the first network. As indicated by step 125, the first and second networks would then communicate and exchange reconnection information. Among other things, the reconnection information may include the location of the second user and any information in the first network that is to be used to reconnect the call to the second user. The reconnection information may also include the switches in the second network that are to be used in the new route. Finally, as indicated by step 129, the call would be reconnected between the first and second users via the second network so that they may resume communications.

FIG. 2 shows exemplary network interconnections for one connection relay scenario in accordance with the present invention. With respect to FIG. 2, two communication networks 201, 202 are shown. For purposes of illustration, it will be assumed that both networks 201, 202 are wireless networks. It should be understood, however, that access to either network 201, 202 may be achieved by using wired handsets. Furthermore, it will be assumed, for the purposes of illustration, that the networks 201, 202 may provide different services, but that they provide at least one service, for example voice calls, in common.

Each of the networks 201, 202 includes at least one switch, and typically will include a large number of switches. Although in FIG. 2 for ease of illustration the network 201 is shown as having two switches 203, 204, and the network 202 is shown as having one switch 205, both networks 201, 202 will typically have multiple switches. Furthermore, it is not necessary for the networks 201, 202 to be based upon the same technology. Thus, for example, the network 201 may use circuit or packet switched technology while the network 202 may use other technologies to provide services, such as Asynchronous Transfer Mode (ATM) for broadband communications.

With respect to FIG. 2, it is assumed that networks 201, 202 have processors programmed to interrupt and recognize special signals such as a pause request and a reconnection request which may be generated as further explained below. The processors may reside locally within each of the switches 203–205. Alternatively, as illustrated in FIG. 2, each of the networks 201, 202 may have associated with it a remote or local central or distributed processor. Thus, a network processor 211 is associated with the network 201, and a network processor 212 is associated with the network 202. It is further assumed that the network processors 211, 212 are capable of communicating with one another. In addition to signaling links connecting the network processors 211, 212, protocol converters, for example, may be used to allow networks employing different switching or protocol technologies to communicate with one another.

Figure 2A:
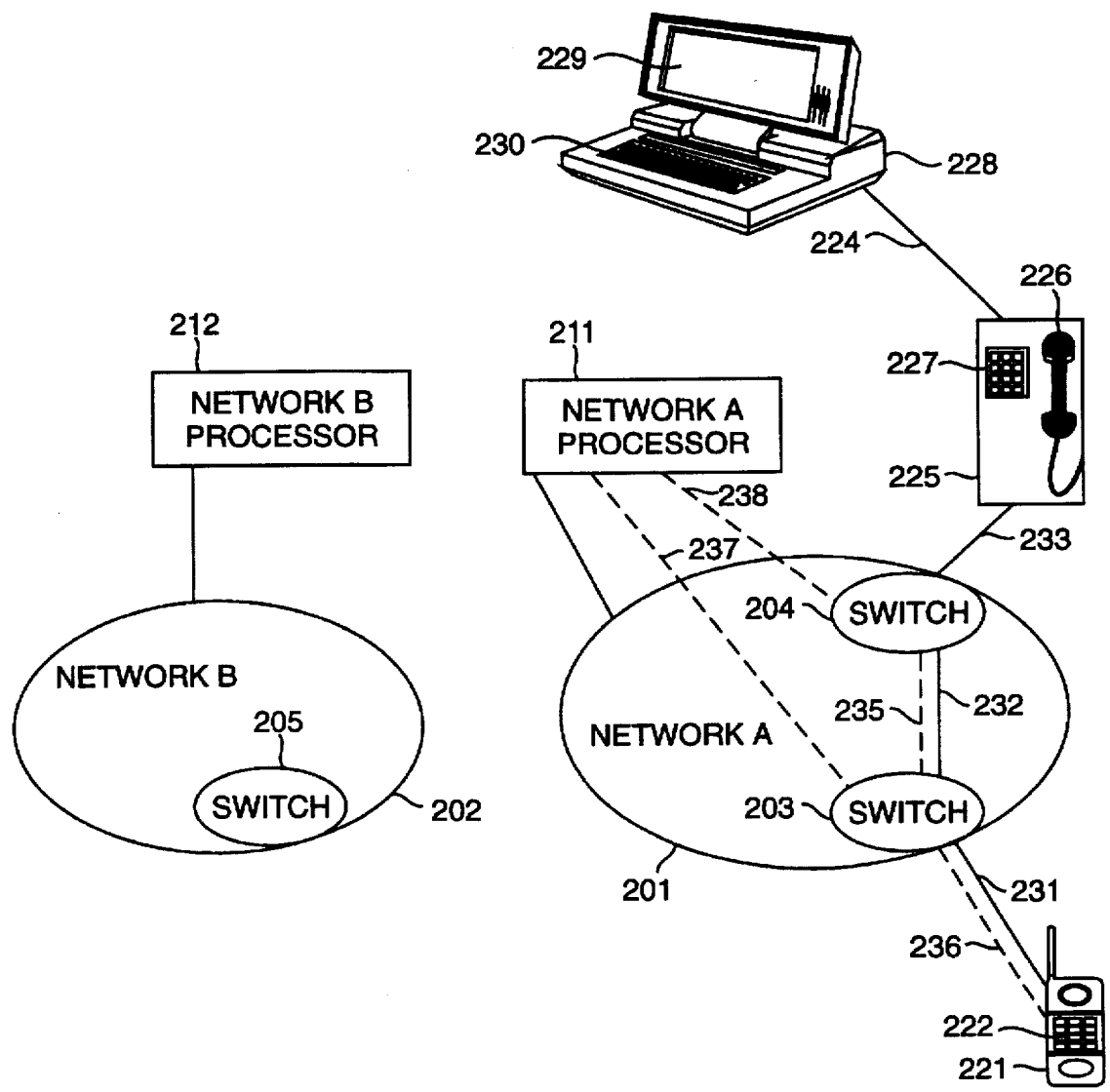
FIGS. 2A and 2B show exemplary network interconnections for one connection scenario in accordance with the present invention.

FIG. 2A illustrates an on-going call or session between two users, one of which is using,for example, a mobile or cellular telephone 221 with a keypad 222. The second user may be using, for example, a wired telephone 225 having a handset 226 and a dialing pad or keypad 227. The telephone 225 may be connected, for example, by a modem 224 to a laptop personal computer 228 which has keyboard 230 and a display screen 229. Generally, in FIGS. 2 through 4, solid lines represent traffic links for carrying voice, data, video or multimedia, whereas dashed lines represent signaling links. For the purposes of illustration, it is assumed that a voice call has already been established by known techniques between the two users, for example, via the network 201. The original connection for the voice call is shown by traffic links 231–233, corresponding, respectively, to the link from the mobile telephone 221 to the switch 203, the link between the switches 203 and 204, and the link from the switch 204 to the telephone 225.

Again, for the purposes of illustration, it is assumed that While the call is on-going, the user of the mobile telephone 221 is in the process of moving from the coverage area of the network 201 to the coverage area of the network 202. Rather than terminating the call and subsequently initiating a new call from within the coverage area of the network 202, the user of the mobile telephone 221 may generate a pause request signal. The pause request signal may be generated, for example, through the keypad 222 by generating predetermined Dual Tone Multi Frequency (DTMF) signals. For convenience, the user generating the pause request may be referred to as the requesting user and the other user may be referred to as a paused user. The pause request signal would then be transmitted to the switch 203 via a signaling link 236. Upon receiving the pause request signal, the switch 203 would send the pause request signal to the network processor 211 via a signaling link 237. Alternatively, if the switch 203 includes suitable local processing means, it would process the pause request locally.

In a preferred embodiment, the processor 211 would notify the paused user of the pause request by sending an appropriate message or signal via a signaling link 238 and the switch 204. Furthermore, in a preferred embodiment, the processor 211 would coordinate with other processors associated with the network 201 in preparation for a possible connection relay from another network regarding this call. For example, the processor 211 would obtain subscriber information required for resumption of the paused call. In any event, the processor 211 preferably issues and transmits reconnection identification information to the requesting user. The call may then be parked and put in a pause state by the network 201.

Figure 2B:
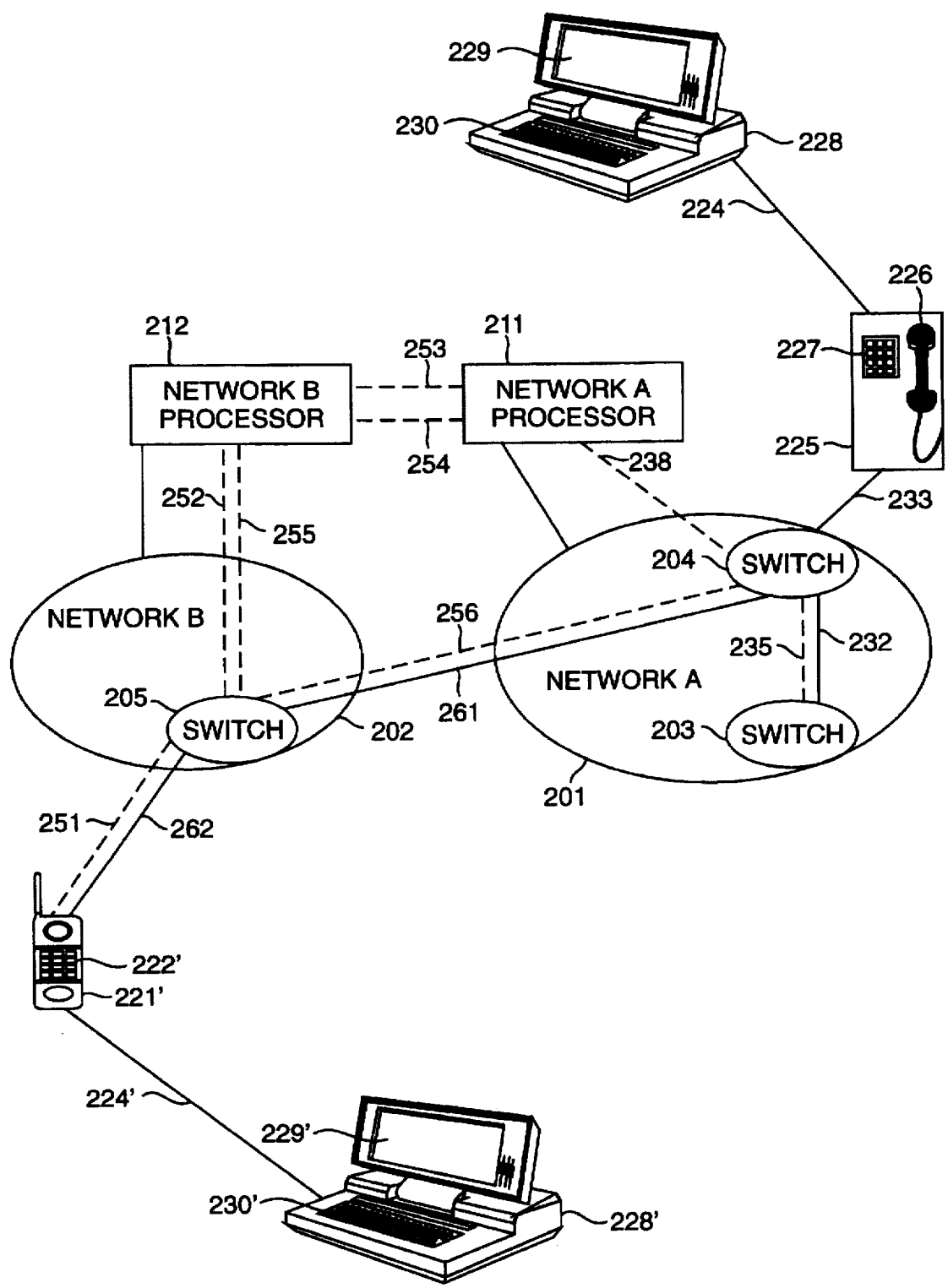

Referring to FIG. 2B, the requesting user would leave the coverage area of the network 201 and enter, for example, the coverage area of the network 202 where he would continue the paused call after obtaining a calling device 221' that is compatible with the services and access technology of the network 202. The device 221' may be a wired telephone or a wireless handset different from the device 221. The differences may be, for example, in the media access protocols and the supported applications. Again, for the purposes of illustration, it will be assumed that the device 221' is also a mobile telephone having a keypad 222'. Alternatively, however, the device 221' could be a handset that is wired to the network 202. The device 221' may also be connected by a modem 224', for example, to a laptop personal computer 228' with a display screen 229' and a keyboard 230'.

The process by which the requesting user enters a session or call with a switch call processor in the network 202 is consistent with the standard session establishment and registration, if any, on the network 202. For example, after any required registration and verification, the requesting user would generate a reconnect request signal by entering on the keypad 222', for example, a standard publicly known number issued by the network 202 for reconnection of paused calls. In one embodiment, the network 202 would prompt the requesting user to enter the reconnection identification information identifying the paused call that the requesting user wishes to continue. The requesting user would then enter the reconnection identification information obtained previously from the network 201 by using, for example, the keypad 222'. The reconnection identification information would then be transmitted via a signaling link 251 to the switch 205 which would then pass the reconnection identification information on to the network processor 212 via a signaling link 252.

in an alternative embodiment, which is particularly advantageous when wireless networks are involved, the requesting user would not be required to enter the reconnection identification information for transmittal to the second network. Rather, the network processor 211 would send reconnection identification information pertaining to the paused call to a processor associated with the user's home network which is typically accessed during registration procedures before a user is permitted to use the services of a network. In this case, the reconnection identification information may comprise, for example, a registration code associated with the requesting user and a code that indicates that a call for that user is currently on hold in the network 201. During the registration process for the second network 202, the user's home network would automatically indicate to the second network's processor 212 that the user had previously made a pause request regarding a call which is currently on hold. The network processor 212 would then send a signal to the requesting user inquiring of the user if he wished to continue the paused call. If the user did wish to continue the paused call, he would generate a reconnection request signal, for example, by entering an appropriate code on the keypad 222' or by speaking an appropriate response into the handset. The reconnection identification information, or an appropriate portion of it identifying the network 201 on which the paused call is being held, would then be sent to the network 202.

Upon receiving the reconnection identification information, the network processor 212 processes this information and compiles a request for further information regarding the user and the paused call from the network processor 211. Alternatively, if the switch 205 has suitable local processing means, it would process the reconnection identification information locally. The address used by the network processor 212 for the network processor 211 may be obtained directly from the reconnection identification information. Alternatively, the address of the network processor 211 may be obtained, for example, from a look-up table which maps a predetermined portion of the reconnection identification information to a desired address for the network 201. The processor 212 then sends the compiled request to the processor 211 via a signaling link 253.

The network processor 211 would then transmit reconnection information via a signaling link 254 to the processor 212. In addition to the location of the paused user and any connections in the network 201 that are to be used to reconnect the call, the reconnection information may include an identification of the services in the network 202 that the requesting user is permitted to access, limitations or restrictions imposed on calls by the requesting user in the network 202, and encryption information that may be required in order to resume or initiate subsequent calls. If any such information indicates that the requesting user is not permitted to continue the paused call on the network 202, then the requesting user may receive a signal or message indicating that the call cannot be reconnected using the network 202. The paused user may similarly be notified, and its connection released.

If, however, the requesting user is permitted to use the network 202, then the processors 211, 212 would communicate so as to determine a new route for reconnection of the paused call. In the example illustrated by FIG. 2, the processors 211, 212 would determine, for example, that the new route should reconnect the requesting user and the paused user via the switch 205 in the network 202 and the switch 204 in the network 201. In a preferred embodiment, and particularly where network resources need to be reserved or allocated, the network processor 211 would notify the switch 204 of the address for the switch 205 by sending a signal or message via the signaling link 238. Similarly, the network processor 212 would notify the switch 205, via a signaling link 255, of a connection for the requesting user to be established through the switch 204. The paused voice call would be reconnected via a traffic link 261 connecting the switches 204, 205. Communications between the requesting user and the paused user would then resume via a traffic link 262 from the mobile telephone 221' to the switch 205, and via the traffic links 261 and 233.

Once the new route is established, and the paused call is reconnected, the previous connections 232, 235 between the switches 203 and 204 may be released, unless required to be maintained for billing or other purposes. In addition, if the parties to the call desired to exchange data by using their respective personal computers 228, 228', they do so without discontinuing the original voice call.

It should be noted that, for the sake of clarity, several signaling links have been shown in FIG. 2 as being separate links. Thus, for example, the signaling links 253 and 254 connecting the network processors 211, 212 in FIG. 2B are shown as separate links. Similarly, the signaling links 252, 255 connecting the network processor 212 and the switch 205 are shown as separate links. In particular applications and technologies, the links may be unidirectional, whereas in other applications and technologies, the links may be bidirectional. It should also be understood that while the above discussion describes one scenario of connection relay in the context of a voice call, a similar method and implementation may be used for data, video or multimedia calls by using, for example, the personal computers 228, 228' and as further explained with reference to FIGS. 3 and 4.

FIG. 3 shows exemplary network interconnections for a multimedia scenario involving multiple end-points in accordance with the present invention. With reference to FIG. 3, two communication networks 301, 302 are shown. Each of the networks 301, 302 includes at least one switch. As before, although in FIG. 3 the network 301 is shown as having three switches 303–305, and the network 302 is shown as having one switch 306, both networks 301, 302 will typically have multiple switches.

Again, it is assumed that the networks 301, 302 have processing means programmed to interrupt and recognize special signals such as a pause request and a reconnection request. The processing means may reside locally within each of the switches 303–306. Alternatively, as illustrated in FIG. 3, each of the networks 301, 302 may have associated with it a remote or local central or distributed processor. Thus, a network processor 311 is associated with the network 301, and a network processor 312 is associated with the network 302. It is further assumed that the network processors 311, 312 have appropriate circuitry and connections for communicating with one another, such as signaling and traffic links as well as protocol converters, if necessary.

Figure 3A:
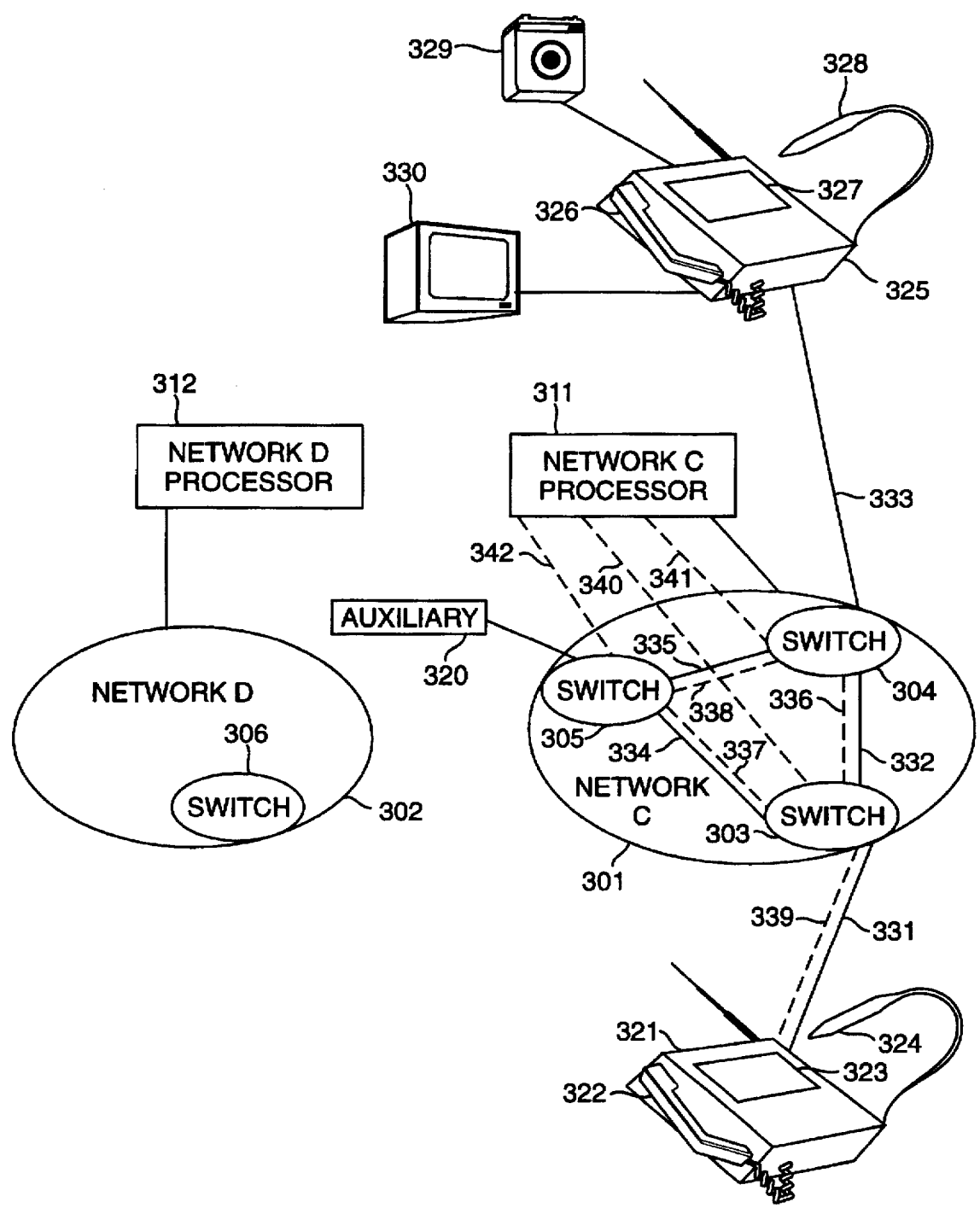
FIGS. 3A and 3B show exemplary network interconnections for a multimedia connection scenario involving multiple end-points in accordance with the present invention.

FIG. 3A illustrates an on-going multimedia call or session between two users, one of which is using, for example, a multimedia calling device 321 with a handset 322, a display screen 323 and a pen 324 for use with pen-based computing capabilities of the device 321. The second user also may be using a multimedia device 325 having a handset 326, a display screen 327 and a pen 328 for use with pen-based computing capabilities of the device 325. Suitable multimedia devices 321, 325 are, for example, EO personal communicators, commercially available from the AT&T Corporation. Alternatively, the devices 321, 325 may comprise a cellular phone, such as the device 221' attached to a personal computer, such as the computer 228'. The calling device 325 may also include a camera 329 and monitor 330 to allow video-teleconferences.

For the purposes of illustration, it is assumed that a multimedia call involving voice and data has already been established by known techniques between the two users via the network 301. The original connection for the multimedia communications between the two users is shown by traffic links 331–333, corresponding, respectively, to the link from the device 321 to the switch 303, the link between the switches 303 and 304, and the link from the switch 304 to the device 325. Each of the traffic links 331–333, which carry the voice and data communications between the two users, may comprise one connection or separate connections for carrying voice and data.

The two users may also be exchanging information with an auxiliary end-point 320 connected to the network 301 via the switch 305. The auxiliary end-point 320 may be, for example, a third application, such as a data or video database. The two users may communicate with the auxiliary end-point 320 through the traffic links 334, 335, respectively. Again, there may be signaling links 336–338, in addition to the traffic links 332, 334–335 connecting the switches to one another.

For the purposes of illustration, it is assumed that while the multimedia call is on-going, the user of the device 321 is in the process of moving from the coverage area of the network 301 to the coverage area of the network 302. The user of the device 321 may generate a pause request signal as explained above. As before, the user generating the pause request may be referred to as the requesting user and the other user may be referred to as a paused user. The pause request signal would then be transmitted to the switch 303 via a signaling link 339. Upon receiving the pause request signal, the switch 303 would send the pause request signal to the network processor 311 via a signaling link 340.

In a preferred embodiment, the processor 311 would notify the paused user of the pause request by sending an appropriate message or signal via a signaling link 341 and the switch 304. Similarly, the processor 311 would notify the auxiliary end-point 320 of the pause request by sending an appropriate message or signal via a signaling link 342 and the switch 305. As before, in a preferred embodiment, the processor 311 would coordinate with other processors associated with the network 301 in preparation for a possible connection from another network regarding this call. In any event, the processor 311 preferably issues and transmits reconnection identification information to the requesting user. The call may then be parked and put on hold by the network 301.

Figure 3B:
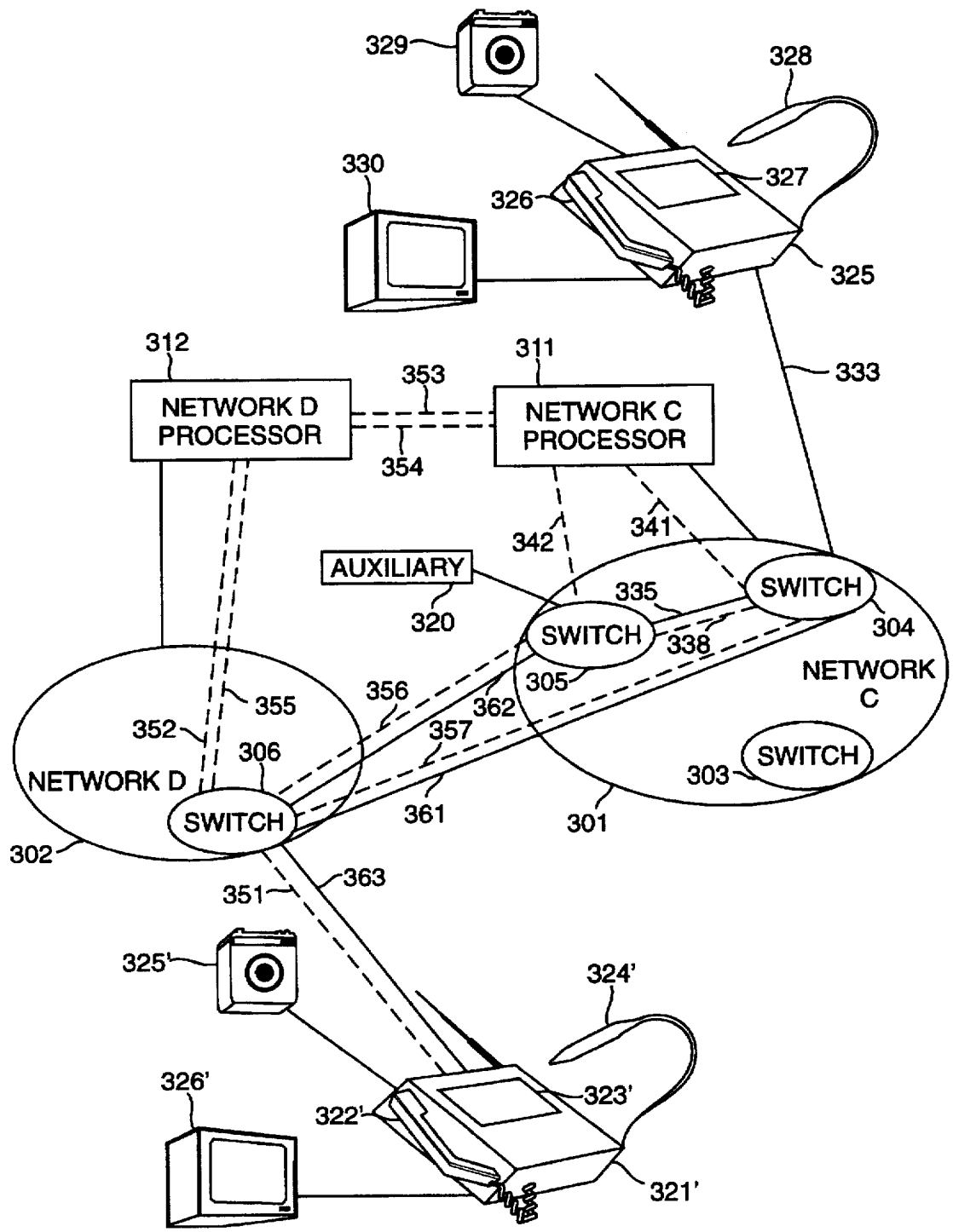

Referring to FIG. 3B, the requesting user would leave the coverage area of the network 301 and enter, for example, the coverage area of the network 302 where he would continue the paused call after obtaining a calling device 321' that is compatible with the services and technology of the network 302. The device 321' may be different from the device 321, depending upon the nature and compatibility of the services and access technologies of the networks 301, 302. Again, for the purposes of illustration, it will be assumed that the device 321' is also a multimedia device having a handset 322', a display screen 323' and a pen 324'for use with pen-based capabilities of the device 321'. The calling device 321' may also comprise a camera 325' and monitor 326' to allow video-conference calls.

After any required registration and verification with respect to the network 302, the requesting user would generate a reconnection request and transmit the reconnection identification information obtained previously from the network 301. The reconnection identification information would then be transmitted via a signaling link 351 to the switch 306 which would then pass the reconnection identification information on to the network processor 312 via a signaling link 352. In an alternative embodiment, the reconnection identification information may be transmitted automatically to the processor 312 from the user's home network during registration procedures.

Upon receiving the reconnection identification information, the network processor 312 processes this information and compiles a request for further information regarding the user and the paused call from the network processor 311. The processor 312 then sends the compiled request to the processor 311 via a signaling link 353.

The network processor 311 would then transmit reconnection information via a signaling link 354 to the processor 312. In the scenario illustrated by FIG. 3, multiple end points with different connection characteristics may be involved. These characteristics may be communicated from the network processor 311 to the network processor 312 along with the reconnection information. Alternatively, the connection characteristics may be included as part of the connection identification information previously sent to the requesting user and subsequently transmitted to the processor 312.

The processors 311, 312 would communicate so as to determine a new route for reconnection of the paused multimedia call to all parties involved. In the example illustrated by FIG. 3, the processors 311, 312 would determine, for example, that the new route should reconnect the requesting user and the paused user via the switch 306 in the network 302 and the switch 304 in the network 301. Similarly, the processors 311, 312 would determine, for example, that the new route should reconnect the requesting user and the auxiliary end-point 320 via the switch 306 in the network 302 and the switch 305 in the network 302. In a preferred embodiment, and particularly where network resources need to be reserved or allocated, the network processor 311 would notify the switches 304 and 305 of the address for the switch 306 by sending a signal or message via the signaling links 341 and 342, respectively. Similarly, the network processor 312 would notify the switch 306, via a signaling link 355, of connections for the requesting user to be established through the switches 304 and 305. The paused multimedia call between the requesting user and the paused user would be reconnected via a traffic link 361 connecting the switches 304, 306. The connection between the requesting user and the auxiliary end-point 320, also a participant in the multimedia session, would be reconnected via a traffic link 362 connecting the switches 305, 306. Communications between the requesting user and the paused user and between the requesting user and the auxiliary end-point 320 would then resume via a traffic link 363 from the multimedia device 321' to the switch 306.

Once the new route is established, and the paused call is reconnected, the previous connections 332, 336 between the switches 303 and 304, as well as the previous connections 334, 337 between the switches 303 and 305, may be released. For the sake of clarity, these previous connections, which may be released once the paused call is reconnected, are not shown in FIG. 3B.

The connection relay scenario discussed above with reference to FIG. 3 may be extended to the situation where three or more end-points, such as the devices 321, 325 and the auxiliary end-point 320, are connected on different networks. FIG. 4 illustrates exemplary network interconnections for a multimedia connection relay scenario involving multiple end-points located in different networks in accordance with the present invention. With reference to FIG. 4, four communication networks 401–404 are shown. Each of the networks 401–404 includes at least one switch, labelled 409–412, respectively. Each of the networks 401–404, however, will typically have multiple switches.

Again, it is assumed that the networks 401–404 have processors programmed to interrupt and recognize special signals such as a pause request and a reconnection request. The processors may reside locally within each of the switches 401–404. Alternatively, as illustrated in FIG. 4, each of the networks 401–404 may have associated with it a central or distributed processor for this purpose. Thus, a network processor 405 is associated with the network 401, and a network processor 406 is associated with the network 402. Similarly, a network processor 407 is associated with the network 403, and a network processor 408 is associated with the network 404. It is further assumed that the network processors 405–408 have means for communicating with one another.

Figure 4A:
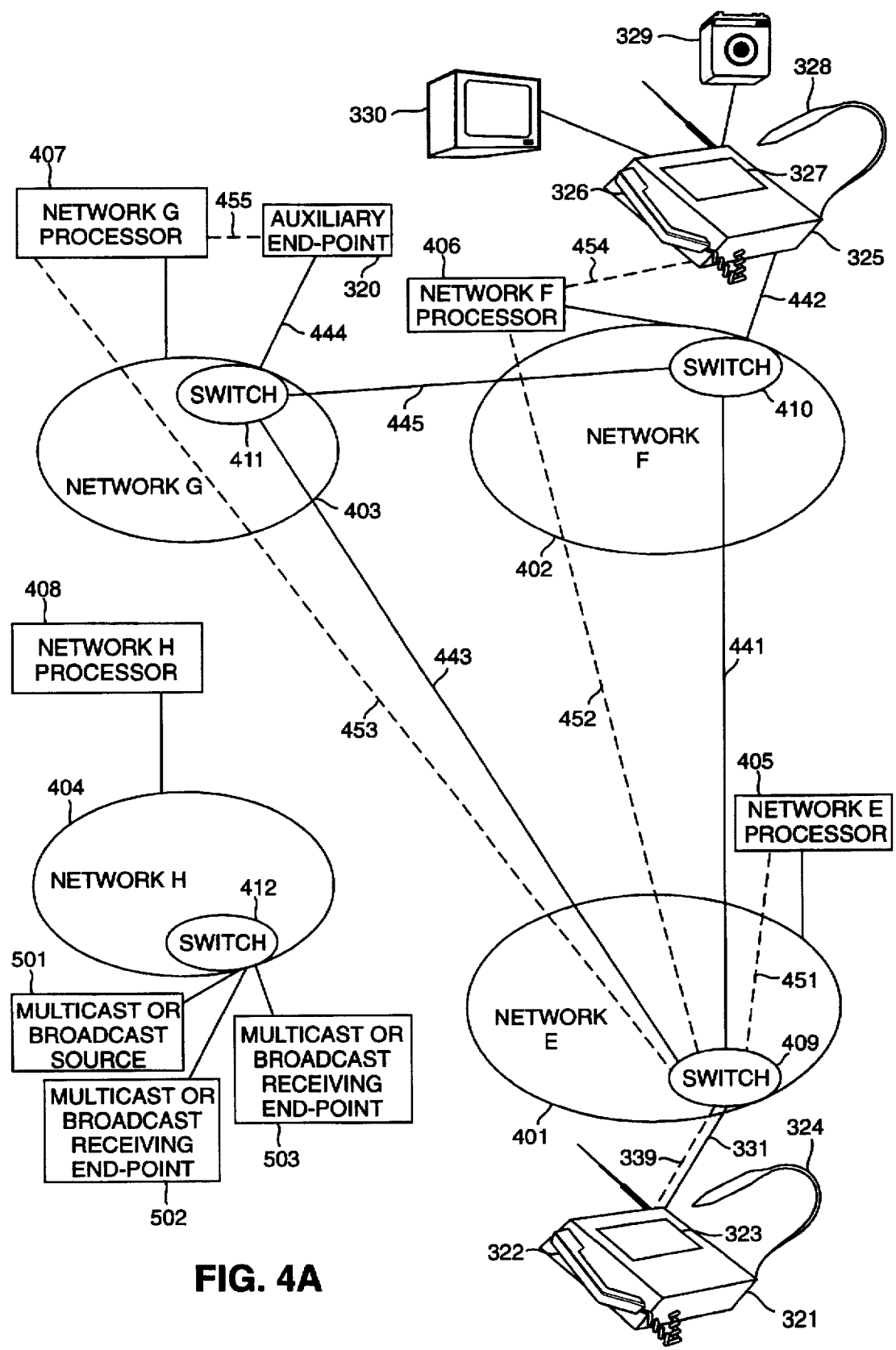
FIGS. 4A and 4B show exemplary network interconnections for a multimedia connection scenario involving multiple end-points located in different networks in accordance with the present invention.

FIG. 4A illustrates an on-going multimedia call or session involving the three end-points 321, 325 and 320. For the purposes of illustration, it is assumed that a multimedia call has already been established connecting the three end-points 321, 325 and 320 which are using the networks 401–403, respectively. The original connection for the multimedia communications between the three end-points 321, 325 and 320 is shown by traffic links 440–445.

For the purposes of illustration, it is again assumed that while the multimedia call is on-going, the user of the device 321 is in the process of moving from the coverage area of the network 401 to the coverage area of the network 404. The user of the device 321 may generate a pause request signal. As before, the user generating the pause request may be referred to as the requesting user and the other user may be referred to as a paused user. The pause request signal would then be transmitted to the switch 409 via a signaling link 450. Upon receiving the pause request signal, the switch 409 would send the pause request signal to the network processors 405-407 via signaling links 451-453, respectively. Alternatively, the switch 409 would notify the processor 405 of the pause request. The processor 405 would then notify the processors 406-407.

In a preferred embodiment, the processor 406 would notify the paused user of the pause request by sending an appropriate message or signal directly via a signaling link 454 or via the switch 410. Similarly, the processor 407 would notify the auxiliary end-point 320 of the pause request by sending an appropriate message or signal directly via a signaling link 455 or via the switch 411. As before, in a preferred embodiment, the processor 405 would coordinate with other processors associated with the network 401 in preparation for a possible connection relay from another network regarding this call. In any event, the processor 405 preferably issues and transmits reconnection identification information to the requesting user. The call may then be parked and put in a pause state by the network 401.

Figure 4B:
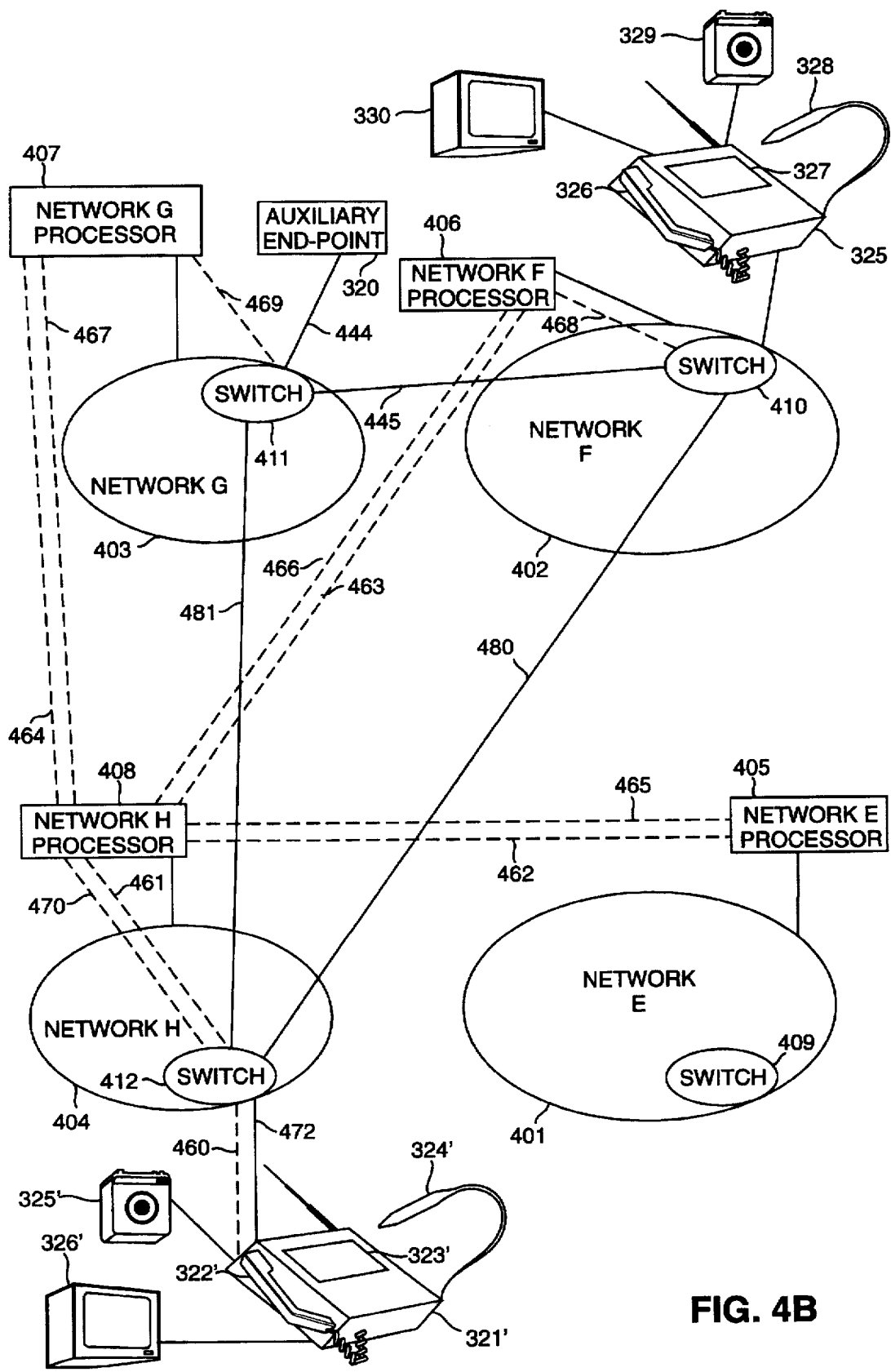

Referring to FIG. 4B, the requesting user would leave the coverage area of the network 401 and enter, for example, the coverage area of the network 404 where he would continue the paused call after obtaining, for example, the calling device 321' that is compatible with the services and technology of the network 404. After any required registration and verification with respect to the network 404, the requesting user would generate a reconnection request and transmit the reconnection identification information obtained previously from the network 401. The reconnection identification information would then be transmitted via a signaling link 460 to the switch 412 which would then pass the reconnection identification information on to the network processor 408 via a signaling link 461. In an alternative embodiment, the reconnection identification information may be transmitted automatically to the processor 408 from the user's home network during registration procedures.

Upon receiving the reconnection identification information, the network processor 408 processes this information and compiles requests for service information regarding the end-points involved in the paused call. The processor 408 would then send the compiled requests to the network processors 405-407 via signaling links 462-464, respectively. The network processors 405-407 may then respond by transmitting reconnection information via signaling links 465-467, respectively, to the processor 408. In a preferred embodiment, the connection characteristics pertaining to the multiple end-points involved in the paused call may be communicated as part of the reconnection information.

The processors 406-408 then may communicate so as to determine a new route for reconnection of the paused multimedia call to all parties involved. In the example illustrated by FIG. 4, the processors 406-408 would determine, for example, that the new route should reconnect the requesting user and the paused user via the switch 412 in the network 404 and the switch 410 in the network 402. Similarly, the processors 406-408 would determine, for example, that the new route should reconnect the requesting user and the auxiliary end-point 320 via the switch 412 in the network 404 and the switch 411 in the network 403. In a preferred embodiment, the network processors 406-408 would notify the switches associated with their respective networks of the addresses for the additional switches in the new route by sending appropriate signals or messages via signaling links 468-470, respectively.

The paused multimedia call between the requesting user and the paused user would be reconnected via a traffic link 480 connecting the switches 410, 412. The connection between the requesting user and the auxiliary end-point 320 would be reconnected via a traffic link 481 connecting the switches 411, 412. Communications between the requesting user and the paused user and between the requesting user and the auxiliary end-point 320 would then resume via a traffic link 472 from the multimedia device 321' to the switch 412.

Once the new route is established, and the paused call is reconnected, the previous connection 441 between the switches 409, 410, as well as the previous connection 443 between the switches 409, 411, may be released. For the sake of clarity, these previous connections, which may be released once the paused call is reconnected, are not shown in FIG. 4B. Also, it should be noted that there may be additional signaling or other links, not shown, which connect the various switches or other system components.

It should also be noted, that the connection relay method described above is applicable to multicast and broadcast sessions or calls as well. With reference to FIG. 4A, there may be a multicast or broadcast source 501 connected via the switch 412 in the network 404 to multiple multicast or broadcast receiving end-points 502, 503. When one of the receiving end-points 502, 503, for example, is in the process of moving from an area covered by one network to the area covered by another network, the connection relay method may be implemented by use of the pause request and subsequent reconnection request as discussed above. The broadcast source may or may not be interrupted, depending upon whether it can be controlled by the end users.

As indicated above, one feature of the present invention is that a communication call may be continued as a user moves from the coverage area of one network to the coverage area of a different network. This feature is particularly advantageous when the calling device used by one of the parties is a mobile device. In such situations, it may often occur that a user desires to travel outside the coverage area of the network on which the call was initiated to an area with which the originating handset or other calling device is not usable. Furthermore, the invention allows an on-going call to be continued even if the device initially used by the requesting user is not compatible with the services or technology of the network covering the area into which the user has moved. The requesting user can use any suitable calling device obtained after he has moved into the coverage area of the new network.

As an additional feature of the present invention, at the time a pause request is generated, neither the user who made the pause request nor the network that parked the call needs to know the identity of the network on which the call will be continued.

Although the present invention has been described with reference to specific embodiments, it will be appreciated that other arrangements within the spirit and scope of the present invention will be readily apparent to persons of ordinary skill in the art. The present invention is, therefore, limited only by the appended claims.

We claim:

1. A method of providing continuation of a communication call across multiple networks comprising the steps of:

establishing a call between a plurality of end-points via a first network;

receiving a pause request signal generated by a user of one of the plurality of end-points;

transmitting reconnection identification information;

holding the call on the first network;

receiving in a second network a reconnection request signal generated by the user; and reconnecting said call to the user via the second network.

2. The method of claim 1 wherein the step of receiving a reconnection request comprises the step of receiving a reconnection request in a second network whose communication access media is different from the communication access media of the first network.

3. The method of claim 2 wherein the step of receiving a pause request signal comprises the step of receiving a pause request signal generated by a user of a first calling device, and wherein the step of reconnecting the call comprises the step of reconnecting the call to the user via a second calling device.

4. The method of claim 1 wherein the step of receiving a pause request signal comprises the step of receiving a pause request signal generated by a user of a first calling device, and wherein the step of reconnecting the call comprises the step of reconnecting the call to the user via a second calling device which is compatible with at least some services and applications different from the services and applications supported by the first calling device.

5. The method of claim 1 wherein the step of receiving a reconnection request signal comprises the step of receiving a reconnection request signal in a second network which provides services and applications different from the first network.

6. The method of claim 1 wherein the steps of transmitting reconnection identification information and holding the call occur automatically in response to the step of receiving a pause request signal.

7. The method of claim 1 wherein the step of transmitting reconnection identification information comprises the step of transmitting a code that identifies the first network.

8. The method of claim 1 wherein the step of transmitting reconnection identification information comprises the step of transmitting a combination of signals that identifies the call.

9. The method of claim 1 further including the step of receiving the reconnection identification information in the second network.

10. The method of claim 9 wherein the step of transmitting reconnection identification information comprises the step of transmitting reconnection identification information to the user prior to the step of holding the call.

11. The method of claim 10 further comprising the step of prompting the user to transmit the reconnection identification information to said second network.

12. The method of claim 1 further comprising the step of receiving at least a portion of the reconnection identification information in the second network automatically.

13. The method of claim 1 further comprising the step of notifying a paused user that a pause request signal was received.

14. The method of claim 1 further comprising the step of notifying an auxiliary end-point involved in the call that a pause request signal was received.

15. The method of claim 1 further including the step of exchanging reconnection information between a processor associated with the first network and a processor associated with the second network.

16. The method of claim 1 further including the step of determining a new route for reconnecting the call.

17. The method of claim 1 wherein the step of establishing a call comprises the step of establishing a voice call.

18. The method of claim 1 wherein the step of establishing a call comprises the step of establishing a data call.

19. The method of claim 1 wherein the step of establishing a call comprises the step of establishing a video call.

20. The method of claim 1 wherein the step of establishing a call comprises the step of establishing a multimedia call.

21. The method of claim 1 wherein the step of receiving a pause request signal comprises the step of receiving a pause request signal generated by a user of a mobile calling device.

22. The method of claim 1 further comprising the step of releasing traffic links between switches in the first network providing connection to the one of the plurality of end-points.

23. An apparatus for providing continuation of a communication call across multiple networks comprising: a plurality of communication networks, wherein each of the plurality of communication networks comprises an associated processor and at least one switch for establishing traffic links, wherein the processor is programmed to intercept and recognize pause request signals and reconnection request signals, and wherein a first processor responds to a pause request signal received during an established call involving a first network with which the first processor is associated by transmitting reconnection identification information and by holding the call on the first network, and wherein the first processor responds to a reconnection request signal and receipt of reconnection identification information associated with a paused call by exchanging reconnection information with a second processor associated with a second of the plurality of communication networks on which the paused call was previously held and by reconnecting the paused call via the first network.

24. The apparatus of claim 23 wherein the first processor responds to a pause request signal by transmitting reconnection identification information to a user who generated the pause request, and wherein the first processor transmits the reconnection identification information prior to holding the call.

25. The apparatus of claim 23 wherein the plurality of communication networks involved in the paused call require different access media.

26. The apparatus of claim 23 wherein the plurality of communication networks support different services and wherein communication networks involved a particular call share at least a subset of common services.

27. The apparatus of claim 23 wherein the processor resides locally within said switch.

28. The apparatus of claim 23 wherein the processor is a distributed processor.

29. The apparatus of claim 23 wherein the processor is a centralized processor.

30. The apparatus of claim 23 wherein the processor further responds to a reconnection request signal and receipt of reconnection identification information associated with a paused call by exchanging reconnection information with additional processors associated with other of the plurality of communication networks involved in the paused call.

31. The apparatus of claim 30 wherein the second processor and the additional processors are distributed processors.

32. The apparatus of claim 30 wherein the second processor and the additional processors are centralized processors.

33. A method of providing continuation of a communication call comprising the steps of:

establishing a call between a plurality of end-points wherein at least one of said end-points is a cellular phone;

receiving a pause request signal generated by a user of the cellular phone;

transmitting reconnection identification information to the user;

holding the call;

generating a reconnection request by the user from a different end-point utilizing a different calling device;

receiving the reconnection request signal generated by the user; and reconnecting said call to the user.

34. The method of claim 33 wherein said cellular phone is part of a first network and said different calling device is part of a second network.

35. The method of claim 34 wherein the reconnection identification includes a code that identifies the first network as well as a combination of signals that identify the call that was paused.

36. The method of claim 33 further comprising the step of allowing users other than the user that generated the pause request to continue communicating during the time that the call is on hold.

37. A method of providing continuation of a communication call so that a user may continue a call while moving from one location to another and changing from a first type of communication device to a second type of communication device comprising the steps of:

establishing a call between a plurality of end-points wherein at least one of said end-points is the first type of communication device and said first type has a first set of operating characteristics;

receiving a pause request signal;

generated by a user of the first type of communication device;

transmitting reconnection identification information to the user;

holding the call;

generating a reconnection request generated by the user from a different end-point utilizing the second type of communication device where said second type has a second and different set of operating characteristics;

receiving the reconnection request signal;

reconnecting said call to the user through said second type of communication device.

38. The method of claim 37 wherein said first type of communication device is part of a first network and said second type of communication device is part of a second network.

39. The method of claim 38 wherein said first type of communication device is a wireless device.

40. The method of claim 38 wherein said second type of communication device is a wireless device.

41. The method of claim 38 wherein the reconnection identification information includes a code that identifies the first network as well as a combination of signals that identify the call that was paused.

42. The method of claim 37 further comprising the step of allowing end-points which have not communicated the pause request to continue communicating during the time that the call is on hold.

* * * * *